Dec. 1, 1964    S. S. PAVICEVIC    3,158,907
RESILIENT SPLIT CORE AND SHELL FOR MOULDING APPARATUS
Filed Nov. 14, 1962
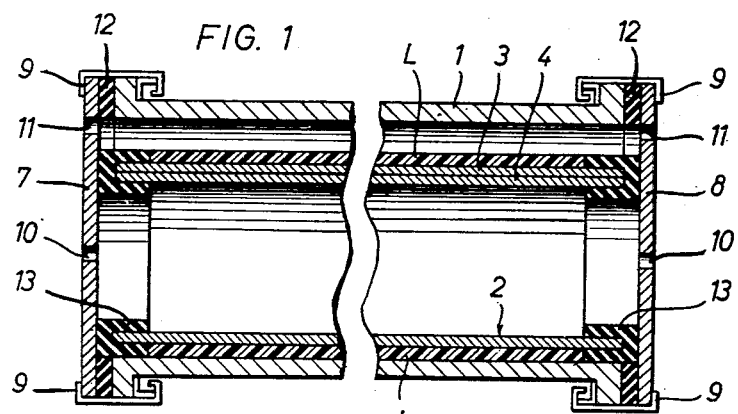
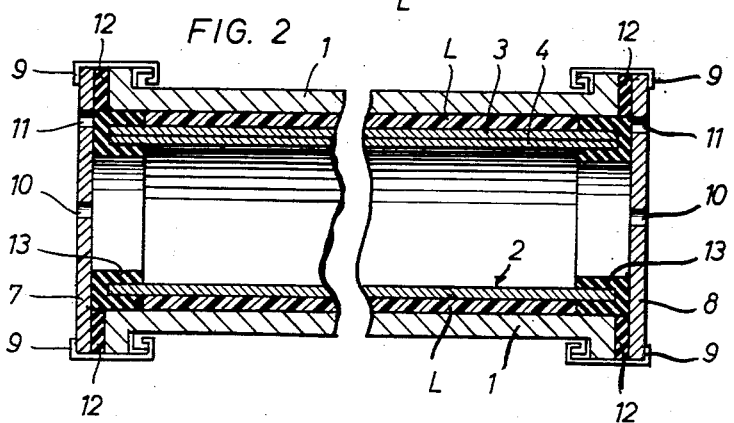
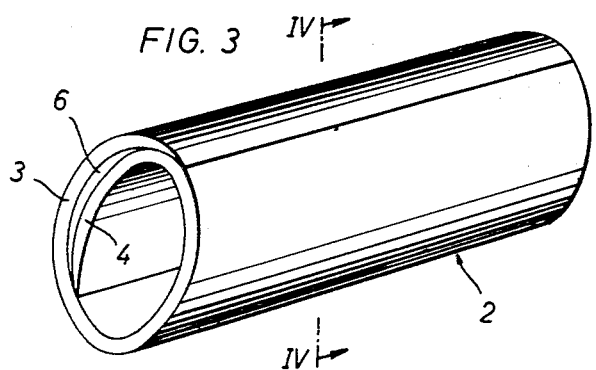

3,158,907
RESILIENT SPLIT CORE AND SHELL FOR MOULDING APPARATUS
Strahinja S. Pavicevic, Putzbrunnerstrasse 11, Ottobrunn, near Munich, Germany
Filed Nov. 14, 1962, Ser. No. 237,591
Claims priority, application Austria, Nov. 14, 1961, A 8,575/61
4 Claims. (Cl. 18—45)

This invention relates to moulds for the production of fabric-reinforced plastic pipes and tubes, the mould comprising an outer shell, an expansible core, and means for forming a fluid-tight seal between the shell and the core at each end.

In a known mould of this kind, the core consists of a rigid cylindrical tube enclosed in an expansible tubular rubber sheath, means being provided for introducing a pressurised fluid, such as compressed air, between the inner tube and the expansible sheath. It is a drawback of such a mould that a fabric-reinforced plastic tube cannot be produced with constant wall thickness throughout, because regions of the tube which initially differ in thickness owing to differences in the thickness of the fabric reinforcement are all exposed to the same radial pressure.

For the production of seamless sleeves from fabrics impregnated with a synthetic resin it has been proposed to use a mould with a longitudinally divided core adapted to be mechanically expanded by the introduction of a tapering mandrel. However, this kind of mould is unsuitable for producing longer sections of tube, for instance several metres in length.

For the continuous mass production of the outer covers of vehicle tires an expanding mould is also known which permits the divided and overlapping core of the mould to be expanded mechanically.

It is an object of the present invention to provide a simple and effective mould for the production of dimensionally accurate and satisfactory glass-fibre-reinforced plastic tubing in relatvely long lengths and of relatively large diameter in such manner that the plastic tubes thus produced will satisfy the strictest requirements.

Accordingly to the present invention the shell of the mould which, in conventional manner, shapes the outside of the reinforced plastic tube is a robust, preferably metallic, tube and the core of the mould which shapes the inside of the plastic tube is a single longitudinally split tube of resilient material with overlapping longitudinal edges, the outer of whch tapers in thickness substantially to zero, a flexible heat resistant seal being interposed between the overlapped portions of the core.

Preferably, the length of the core corresponds exactly with the length of the shell, and the overlap of the edges in the free or unexpanded state of the core conveniently embraces at least one third of its circumference.

Advantageously the ends of the core are encased in detachable U-section seals of a resiliently expansible heat-resistance substance.

Conventional end plates are detachably affixed to the ends of the mould and the inside surfaces of these plates are preferably highly polished or chromium-plated. Annular compressible seals are preferably inserted between the end plates and the end edges of the shell, these seals being heat resistant and having an inside diameter at least equal to the internal diameter of the shell. They may be affixed to the edges of the shell or to the inside faces of the end plates.

At least one of the end plates is provided with a port for connecting the interior of the core with a source of pressure for expanding it; alternatively, the mould cavity formed by the annular gap or clearance space between the core and the shell can be evacuated through another port by a suction pump for the same purpose.

The shell may be of multipart, preferably two-part construction and it may be provided with chambers for cooling or heating the interior of the mold.

Preferred embodiments of the invention will now be described, by way of example only, with reference to the accompanying drawings in which:

FIG. 1 is an axial section of an assembled mould before the core is expanded;

FIG. 2 is a view similar to FIG. 1 showing the core expanded during the moulding process;

FIG. 3 is a fragmentary perspective view of the core;

Referring first to FIGS. 1 and 2, a mould according to the invention for producing tubes or pipes of glass-fibre-reinforced plastic comprises a relatively thick walled metal tube 1 forming an outer shell and capable of withstanding internal gauge pressures up to about 20 atmospheres. The internal surface of the shell is highly polished or chromium-plated to give a high finish to the hardened plastic tube and facilitate its parting from the shell.

The core 2 of the mould, shown in greater detail in FIG. 3, is formed by a longitudinally divided resilient tube with peripherally overlapping longitudinal edges 3, 4, which tends to contract radially and is preferably made of spring steel. The overlap of the longitudinal edges 3 and 4 embraces at least one third of the periphery of the tubular core when at rest, and the other part is gradually tapered in thickness to substantially zero to present a fine edge.

Figure 4:
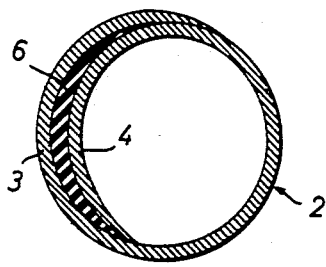
FIG. 4 is a section on the line IV—IV of FIG. 3.

Between the overlapped portions adjacent the edges 3 and 4 is placed a seal 6 (FIGS. 3 and 4). This seal may be fixed to the inside of the outer overlap portion, and has a smooth low-friction surface. The external surface of the core 2, including the lapped portions, is highly polished or chromium plated to give a high internal finish to the moulded plastic tube and enable it to be easily detached from the core.

The diameter of the core 2 is variable. In its normally contracted state its overall diameter is less than the internal diameter of the outer shell 1 by at least the maximum required wall thickness of the finished tube, and should be capable of being expanded in the free state to an outer diameter exceeding the internal diameter of the shell 1 by as much as 20% without separation of the edges 3, 4. The length of the core 2 is equal to that of the shell 1 so that when inserted into the shell the ends of the core and the shell are completely flush.

End plates 7, 8 are secured to each end of the outer shell 1 by clamps 9 which are only schematically indicated in FIGS. 1 and 2. One or both end plates 7, 8 are provided with a central inlet port 10 for connection with a source of compressed air for expanding the core 2. An air exhaust port 11 registers with the mould cavity formed by the annular gap or space between the core 2 and the shell 1 for connection to a vacuum pump so that air can be evacuated from this space. In order to ensure a tight joint between the end plates 7, 8 and the core 2, the ends of the latter are fitted with detachable resilient U-section gaskets 13 which have smooth low-friction outer surfaces. Also between the end plates 7, 8 and the ends of the shell 1 are inserted resilient heat-resistant annular gaskets 12 which have an inner diameter at least as large as the internal diameter of the shell 1, and which are fixed to the ends of the shell 1 or to the inside faces of the end plates 7, 8.

A glass-fibre-reinforced plastic tube is produced in a mould as described above in the following manner. The inside surface of the outer shell 1 and the outside surface of the split core tube 2, including the overlapped portions, are first coated with a conventional parting agent. The glass-fibre fabric L, impregnated with the liquid synthetic resin, is wound on to the core 2 in one or several layers. The core and its wrapping are then inserted into the shell and the core is adjusted so that its ends are flush with the ends of the shell. The end plates 7, 8 are then clamped in position. A vacuum pump is then connected to the exhaust port 11 to evacuate the clearance space or mould cavity between the shell and the core, and at the same time a compressor is connected to the inlet port 10 and forces air into the core 2 until the core 2 expands, simultaneously stretching the resilient U-ring gaskets 13 at each end, so that the plastic-impregnated glass-fibre L is pressed against the inside of the shell 1 of the mould. The quantity of resin used for impregnating the glass-fibre fabric must be selected to ensure that there is no surplus resin when the core 2 has been fully expanded. The laminate L is then hardened in conventional manner. This process is determined by the nature of the synthetic resin employed.

When the laminate L has hardened, the compressed air is released from the tubular core 2 and the end plates 7, 8 are detached. The core 2 contracts to its original size and the finished tube can be easily removed from the mould.

Figure 5:
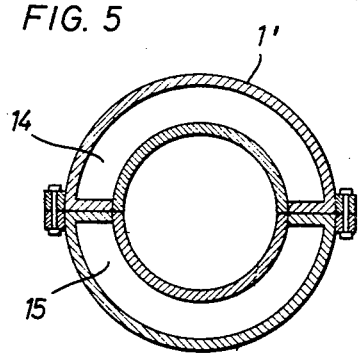
FIG. 5 is a cross-section of a modified shell.

In the modification shown in FIG. 5, the shell 1' of the mould is double-walled and of two-part construction, forming semi-annular chambers 14, 15 into which superheated steam can be introduced for setting the plastic. When the plastic tube has hardened, a coolant may be passed through these chambers.

Figure 6:
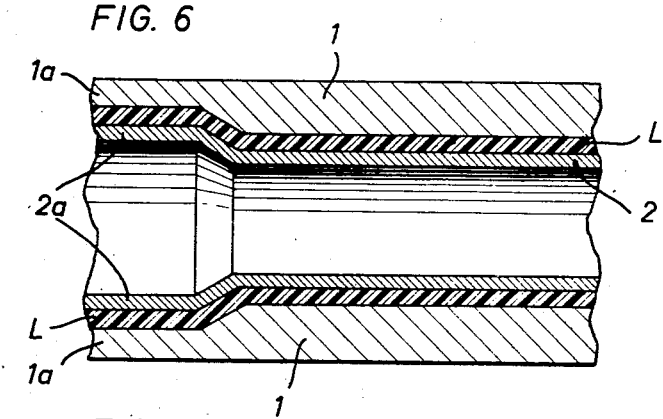
FIG. 6 is an axial section through one end of a mould for forming plastic pipes or tubes with socket ends.
Figure 7:
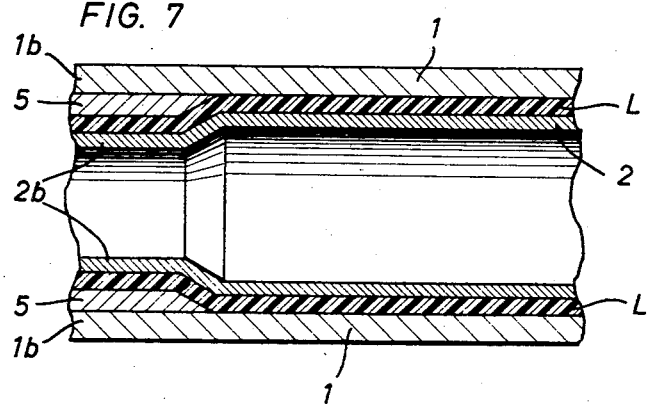
FIG. 7 is a view similar to FIG. 6 of a mould for producing reduced ended pipes.

In order to permit the ends of the finished tubes L to be inter-fitted, they may be formed with a socket end (FIG. 6) for insertion thereinto of the plain spigot end of another pipe or tube. For production of tubes of this kind one end of the shell 1 of the mould must be widened on the inside at 1a and the core tube 2 flared accordingly at the same end 2a. Alternatively, as illustrated in FIG. 7, one end of each plastic tube L may be necked. For making such tubes one end 1b of the shell 1 must be suitably reduced in diameter, for instance by the insertion of a short sleeve or bush 5 which is preferably fixed to the internal wall of the shell 1. The corresponding end 2b of the core 2 is reduced accordingly.

A single longitudinally split and overlapped core tube according to the present invention must be capable of radial expansion over a given working range of diameters without risk of reduction of the angular extent of overlap of the longitudinal edges 3, 4 beyond a safe minimum. This minimum will be determined in any particular case partly by the need to maintain an accurately cylindrical effectively continuous external wall surface during expansion, and partly by the need to maintain an effective fluid pressure seal at all working pressures and diameters. The degree of taper of the outer overlapping portion or layer will also depend on the resilience of the core material and on its normal thickness. Clearly, a thinner or finer edge 3 can be permitted as the resilience is increased.

Any convenient pressure fluid may be used to expand the core 2—for example, oil or water may be pumped into the core through the inlet port 10 in place of air or other gas. Where a liquid is used, its temperature may be controlled so as to facilitate the most efficient hardening of the plastic tube being formed. To ensure the necessary degree of control of this temperature, the fluid under pressure to cause expansion of the core may be continuously circulated under the required pressure—as by converting one of the inlet ports 10 into an outlet port.

The permanently overlapped inner portion of the split tube adjacent the internal longitudinal edge 4 may be deformed from a cylindrical contour in order to accommodate the pressure fluid seal material 6. This seal must be capable of withstanding the maximum working fluid pressure difference required to be established across the core in order to produce both the necessary radial expansion of the split tube and the exertion of the necessary radial pressure on the reinforced plastic tube during hardening thereof. It must also withstand the working temperature range of the core 2 whilst imposing a minimum of frictional drag on the overlapping layers or zones of the tube wall.

I claim:

1. A mould for producing reinforced plastic tubes and the like comprising a shell and a core within the shell, and means for closing the ends of both the shell and the core in fluid-tight manner, wherein the core is formed by a single longitudinally split resilient expansible tube whose longitudinal edges overlap to an extent sufficient to allow the tube to expand at least to its normal working limit of diameter without reduction of the extent of overlap below a safe minimum at which the tube continues to present an effectively continuous cylindrical outer surface under working conditions, means for introducing a fluid under pressure into the interior of the core tube, and a low friction fluid pressure seal inserted between the overlapping portions of the resilient core tube.

2. A mould for producing reinforced plastic tubes and the like comprising a shell and a core, said shell comprising a cylindrical body, flanges formed on the ends of the shell, end plates covering the ends of the shell, a resilient heat resistant annular gasket between each end plate and the adjacent flange on the shell, means securing the end plates to the flanges of the shell, said core lying within the shell and comprising a longitudinally divided resilient tube with peripherally overlapping longitudinal edges which tend to contract radially, the outer edge portion tapering toward the end of the portion, a sealing material between the overlapped portions of the core, U-ring resilient gaskets embracing the ends of the core, said gaskets expanding in diameter when the core is expanded radially, and means in the end plates to provide for the admission of fluid under pressure to within the core and for the venting of air from the cylindrical space between the core and the shell.

3. A mould for producing reinforced plastic tubes and the like comprising a shell and a core, said shell comprising a cylindrical body with a smooth interior face therein, flanges formed on the ends of the shell, end plates covering the ends of the shell, a resilient heat resistant annular gasket between each end plate and the adjacent flange on the shell, said gasket having an internal diameter at least as large as the internal diameter of the shell, means securing the end plates to the flanges of the shell, said core lying within the shell and comprising a longitudinally divided resilient tube with peripherally overlapping longitudinal edges which tend to contract radially and made of spring steel, the outer edge portion tapering toward the end of the portion, a sealing material between the overlapped portions of the core, said material having a smooth low-friction surface, U-ring resilient gaskets embracing the ends of the core and slidingly engaging the interior faces of the end plates, said gaskets expanding in diameter when the core is expanded radially, and means in the end plates to provide for the admission of fluid under pressure to within the core and for the venting of air from the cylindrical space between the core and the shell.

4. A mould for producing reinforced plastic tubes and the like comprising a shell and a core within the shell, and means for closing the ends of both the shell and the core in fluid-tight manner, wherein the core includes longitudinally split resilient expansible tube means whose longitudinal edges overlap to an extent sufficient to allow the tube means to expand at least to a normal working limit of diameter of the tube means without reduction of extent of overlap below a safe minimum at which the tube means continues to present an effectively continuous cylindrical outer surface under working conditions, means for introducing a fluid under pressure into the interior of the core tube means, and a low-friction fluid pressure sealing means inserted between said overlapped portions of the resilient core tube means.

UNITED STATES PATENTS
References Cited by the Examiner

| | | | |
|---|---|---|---|
| 710,596 | 10/02 | Morris | 25—128 |
| 861,106 | 7/07 | Georgenson. | |
| 935,529 | 9/09 | Maag. | |
| 1,552,064 | 9/25 | Lake | 25—128 |
| 1,757,487 | 5/30 | Soule | 25—128 |
| 2,628,402 | 2/53 | Billner | 25—128 |
| 2,999,272 | 9/61 | Warnken | 18—34 |

MICHAEL V. BRINDISI, *Primary Examiner.*

WILLIAM J. STEPHENSON, *Examiner.*